United States Patent [19]

Ohta et al.

[11] Patent Number: 5,086,125
[45] Date of Patent: Feb. 4, 1992

[54] POLYIMIDE RESIN COMPOSITION

[75] Inventors: Masahiro Ohta, Yokohama; Saburo Kawashima, Yokosuka; Katsuaki Iiyama, Odawara; Shoji Tamai; Hideaki Oikawa, both of Yokohama; Akihiro Yamaguchi, Kamakura, all of Japan

[73] Assignee: Mitsui Toatsu Chemicals, Inc., Tokyo, Japan

[21] Appl. No.: 574,502

[22] Filed: Aug. 24, 1990

Related U.S. Application Data

[63] Continuation of Ser. No. 199,702, May 27, 1988, abandoned.

[30] Foreign Application Priority Data

Jun. 2, 1987 [JP] Japan ................................. 62-137756
Jun. 2, 1987 [JP] Japan ................................. 62-137757
Dec. 17, 1987 [JP] Japan ................................. 62-317451

[51] Int. Cl.$^5$ ........................ C08L 79/08; C08L 81/06; C08G 69/48
[52] U.S. Cl. .................................... 525/432; 525/420; 525/436; 525/537; 525/906; 525/928
[58] Field of Search .............. 525/436, 537, 432, 928, 525/906, 420

[56] References Cited

U.S. PATENT DOCUMENTS 4,455,410 6/1984 Giles et al. ......................... 525/436

FOREIGN PATENT DOCUMENTS 62-53388 3/1987 Japan .
WO83/03417 10/1983 PCT Int'l Appl. .
2199586 7/1988 United Kingdom .

Primary Examiner—Ana L. Carrillo
Attorney, Agent, or Firm—Burns, Doane, Swecker & Mathis

[57] ABSTRACT

This invention relates to molding resin compositions, and more particularly relates to polyimide resin compositions having markedly improved molding ability in addition to excellent high temperature stability, chemical resistance and mechanical strength.

The polyimide resin composition of this invention comprises 99.9 to 50% by weight of the polyimide and 0.1 to 50% by weight of high temperature engineering polymer. The polyimide has recurring units of the following formula:

wherein X is a sulfonyl radical or a carbonyl radical and R is a tetravalent radical selected from an aliphatic radical, alicyclic radical, monoaromatic radical, condensed aromatic radical and non-condensed aromatic radical. R is, for example, The high temperature engineering polymer is, for example, polyphenylene sulfide consisting of recurring units of the formula:

aromatic polysulfone consisting of recurring units of the formula:

or aromatic polyetherimide consisting of recurring units of the formula:

-continued
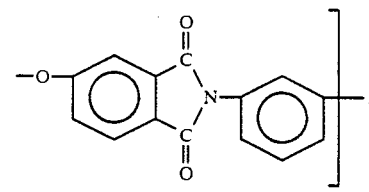
5 Claims, No Drawings

POLYIMIDE RESIN COMPOSITION

This application is a continuation of application Ser. No. 199,702, filed May 27, 1988, now abandoned.

BACKGROUND OF THE INVENTION

The present invention relates to a molding resin composition, and more particularly relates to a molding resin composition of polyimide which is excellent in high-temperature stability, chemical resistance and mechanical strength as well as processing ability in molding.

Polyimide has so far been excellent in mechanical strength and dimensional stability in addition to high-temperature resistance Besides it has also flame retardance and electrical insulative properties. Therefore polyimide has been used in the field of electric and electronic parts, aeronautics and space instruments and transport machinery, and is also expected for a wide use in the future in the field where high temperature resistance is required.

Many kinds of polyimides which exhibit outstanding properties have been developed to date. Some types of polyimides, however, have excellent high-temperature resistance whereas they have no definite glass transition temperature and require a sinter molding method for processing them.

On the other hand, other types of polyimides have excellent processing ability whereas they have low glass transition temperatures and are soluble in halogenated hydrocarbons. They are unsatisfactory from a viewpoint of high temperature stability and solvent resistance. Thus there are both merits and drawbacks in their properties.

Accordingly polyimide has been desired which is excellent in high-temperature stability and solvent resistance and also has an outstanding processing ability as a molding material.

As to polyimide which satisfies above mentioned properties, the present inventors have found polyimide having recurring units of the following formula:

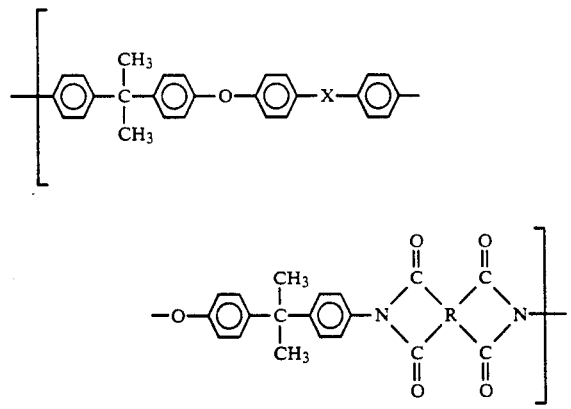

wherein X is a sulfonyl radical or a carbonyl radical and R is a tetra-valent radical selected from the group consisting of aliphatic radical having 2 or more carbon atoms, alicyclic radical, monoaromatic radical, to condensed polyaromatic radical, and non-condensed polyaromatic radical wherein aromatic radicals are linked to one another directly or via a bridge member. (Japanese Laid-Open Patent No. TOKKAISHO 62-53388 (1987)).

The above polyimide is a thermoplastic polyimide having fluidity in high temperatures in addition to excellent mechanical, thermal and electrical properties which are in polyimide.

Compared with ordinary engineering polymers represented by polyethylene terephthalate, polybutylene terephthalate, polysulfone and polyphenylene sulfide, the polyimide is superior to these polymers in high-temperature resistance and other properties. On the other hand, the processing ability of the polyimide is still inferior to these polymers.

Generally in injection molding or extrusion molding, lower melt viscosity leads to better processing ability. For example, higher melt viscosity requires higher injection pressure in the molding stage and the molded products are subject to excessive stress thereby lowering operation efficiency and causing adverse effects on the properties of molded products. The above stated polyimide can be injection molded because it has an excellent fluidity at high temperatures. The polyimide is nevertheless required to enhance its workability.

SUMMARY OF THE INVENTION

The object of this invention is to provide a molding resin composition of polyimide which has a very excellent melt flowability without adverse effects on the essential properties of polyimide.

DETAILED DESCRIPTION OF THE INVENTION

The present inventors have intensively investigated in order to achieve the above object, thereby leading to the present invention.

That is, the present invention is a polyimide resin composition comprised of 99.9 to 50% by weight of polyimide which has recurring units of the formula:

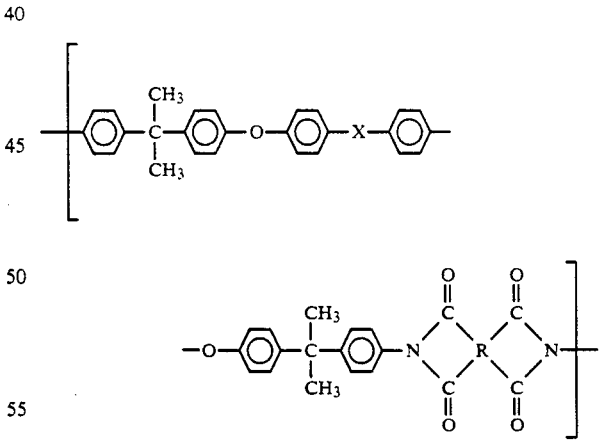

wherein X is a sulfonyl radical or a carbonyl radical and R is a tetra-valent radical selected from the group consisting of aliphatic radical having 2 or more carbon atoms, alicyclic radical, monoaromatic radical, condensed polyaromatic radical, and non-condensed polyaromatic radical wherein aromatic radicals are linked to one another directly or via a bridge member, and 0.1 to 50% by weight of a high-temperature engineering polymer selected from the group consisting of polyphenylene sulfide, aromatic polysulfone and aromatic polyetherimide.

Polyimide used in the method of this invention is derived from etherdiamine of the following formula:

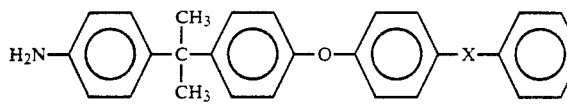

wherein X is a carbonyl or a sulfonyl radical. Examples of etherdiamine are 4,4′-bis[4-(4-amino-α,α-dimethylbenzyl)phenoxy] benzophenone or bis[4-(4-(4-amino-α,α-dimethylbenzyl)phenoxy)phenyl] sulfone. The etherdiamine is reacted with at least one of tetracarboxylic acid dianhydride in an organic solvent. The resulting polyamic acid is imidized to obtain polyimide.

The tetracarboxylic acid dianhydride used in the above reaction is an anhydride of the formula:

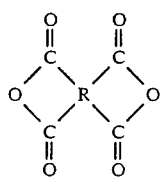

where R is the same as above.

The tetracarboxylic acid dianhydride used in the method includes, for example, ethylenetetracarboxylic dianhydride, butanetetracarboxylic dianhydride, cyclopentanetetracarboxylic dianhydride, pyromellitic dianhydride,
3,3′,4,4′-benzophenonetetracarboxylic dianhydride,
2,2′,3,3′-benzophenonetetracarboxylic dianhydride,
3,3′,4,4′-biphenyltetracarboxylic dianhydride,
2,2′,3,3′-biphenyltetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl) ether dianhydride, bis(3,4-dicarboxyphenyl)
sulfone dianhydride, 1,1-bis-(2,3-dicarboxyphenyl)ethane dianhydride,
bis(2,3-dicarboxyphenyl)methane dianhydride,
bis(3,4-dicarboxyphenyl)methane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.

Particularly preferred tetracarboxylic acid dianhydrides are pyromellitic dianhydride, 3,3′,4,4′-biphenyltetracarboxylic dianhydride, 3,3′,4,4′-benzophenonetetracarboxylic dianhydride.

The tetracarboxylic acid dianhydride can be used alone or in mixtures of two or more.

The polyimide which is used in the composition of this invention is prepared by using the above stated etherdiamine as a raw material In to obtain the composition of this invention, other diamines can also be used in combination with etherdiamine within the range which no adverse effect on the good properties of polyimide.

Examples of diamines which may be used in admixture with the etherdiamine include, m-phenylenediamine, o-phenylenediamine, p-phenylenediamine, m-aminobenzylamine, p-aminobenzylamine, bis(3-aminophenyl) ether, (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl) (4-aminophenyl) sulfoxide, bis(4-aminophenyl) sulfoxide, bis(3-aminophenyl) sulfone, (3-aminophenyl) (4-aminophenyl) sulfone, bis(4-aminophenyl) sulfone, 3,3′-diaminobenzophenone, 3,4′-diaminobenzophenone, 4,4′-diaminobenzophenone,
bis[4-(3-aminophenoxy)phenyl]methane,
bis[4-(4-aminophenoxy)phenyl]methane,
1,1-bis[4-(3-aminophenoxy)phenyl]ethane,
1,1-bis[4-(4-aminophenoxy)phenyl]ethane,
1,2-bis[4-(3-aminophenoxy)phenyl]ethane,
1,2-bis[4-(4-aminophenoxy)phenyl]ethane,
2,2-bis[4-(3-aminophenoxy)phenyl]propane,
2,2-bis[4-(4-aminophenoxy)phenyl]propane,
2,2-bis[4-(3-aminophenoxy)phenyl]butane,
2,2-bis[4-(4-aminophenoxy)phenyl]butane,
2,2-bis[4-(3-aminophenoxy)phenyl]-1,1,1,3,3,3-hexafluoropropane,
2,2-bis[4-(4-aminophenoxy)phenyl-1,1,1,3,3,3-hexafluoropropane,
1,3-bis(3-aminophenoxy)benzene, 1,3-bis(4-aminophenoxy)benzene,
1,4-bis(3-aminophenoxy)benzene, 1,4-bis(4-aminophenoxy)benzene,
4,4′-bis(3-aminophenoxy)biphenyl, 4,4′-bis(4-aminophenoxy)biphenyl,
bis[4-(3-aminophenoxy)phenyl] ketone,
bis[4-(4-aminophenoxy)phenyl] ketone,
bis[4-(3-aminophenoxy)phenyl] sulfide,
bis[4-(4-aminophenoxy)phenyl] sulfide,
bis[4-(3-aminophenoxy)phenyl] sulfoxide,
bis[4-(4-aminophenoxy)phenyl] sulfoxide,
bis[4-(3-aminophenoxy)phenyl] sulfone,
bis[4-(4-aminophenoxy)phenyl] sulfone,
bis[4-(3-aminophenoxy)phenyl] ether,
bis[4-(4-aminophenoxy)phenyl] ether,
1,4-bis[4-(3-aminophenoxy)benzoyl]benzene and
1,3-bis[4-(3-aminophenoxy)benzoyl]benzene.

The high temperature engineering polymer which is used in the present invention includes, for example, polyphenylene sulfide, aromatic polysulfone and aromatic polyetherimide.

Polyphenylene sulfide is a resin having recurring units of the formula:

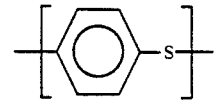

The preparation process of the resin is disclosed, for example, in U.S. Pat. No. 3,354,129 and Japanese Patent Publication TOKKOSHO 45-3368 (1970). The resin can be commercially available, for example, as RYTON (Trade Mark of Phillips Petroleum Co. in U.S.A.). According to the patent disclosure, polyphenylene sulfide is produced by reacting p-chlorobenzene with sodium sulfide monohydrate at 160–250° C. under pressure in N-methylpyrrolidone solvent. Polyphenylene sulfide includes various grades such as from non-crosslinked to partially crosslinked polymers and polymers having different polymerization degrees. These grades can be easily produced by conducting a post-treatment process and are also available in the market. Therefore grades having suitable melt viscosity for the desired polymer blend can be optionally prepared or purchased in the market.

Aromatic polysulfone is a well known high temperature engineering polymer having a polymer chain represented by the formula:

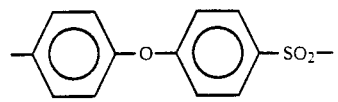

and described, for example, by V.J. Leslie et al, in CHEMITECH, July 1975, 426–432.

Representative examples of recurring units constituting aromatic polysulfone of this invention include:

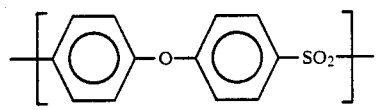

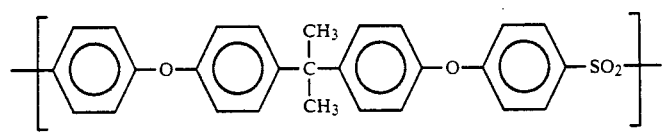

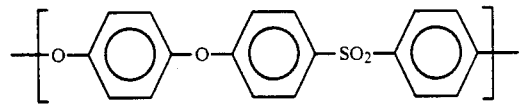

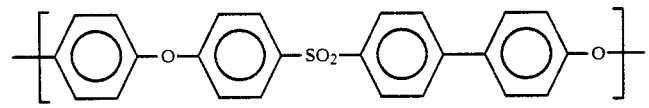

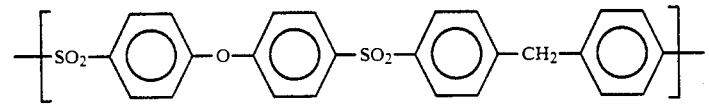

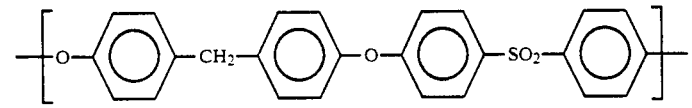

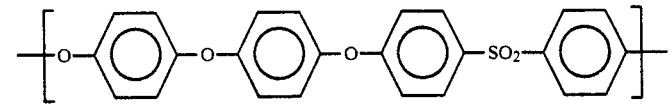

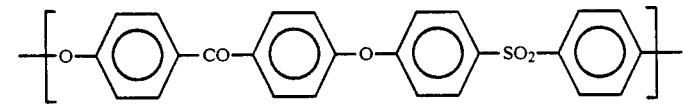

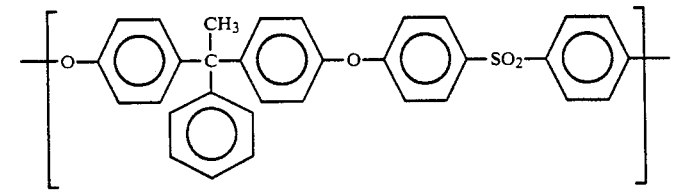

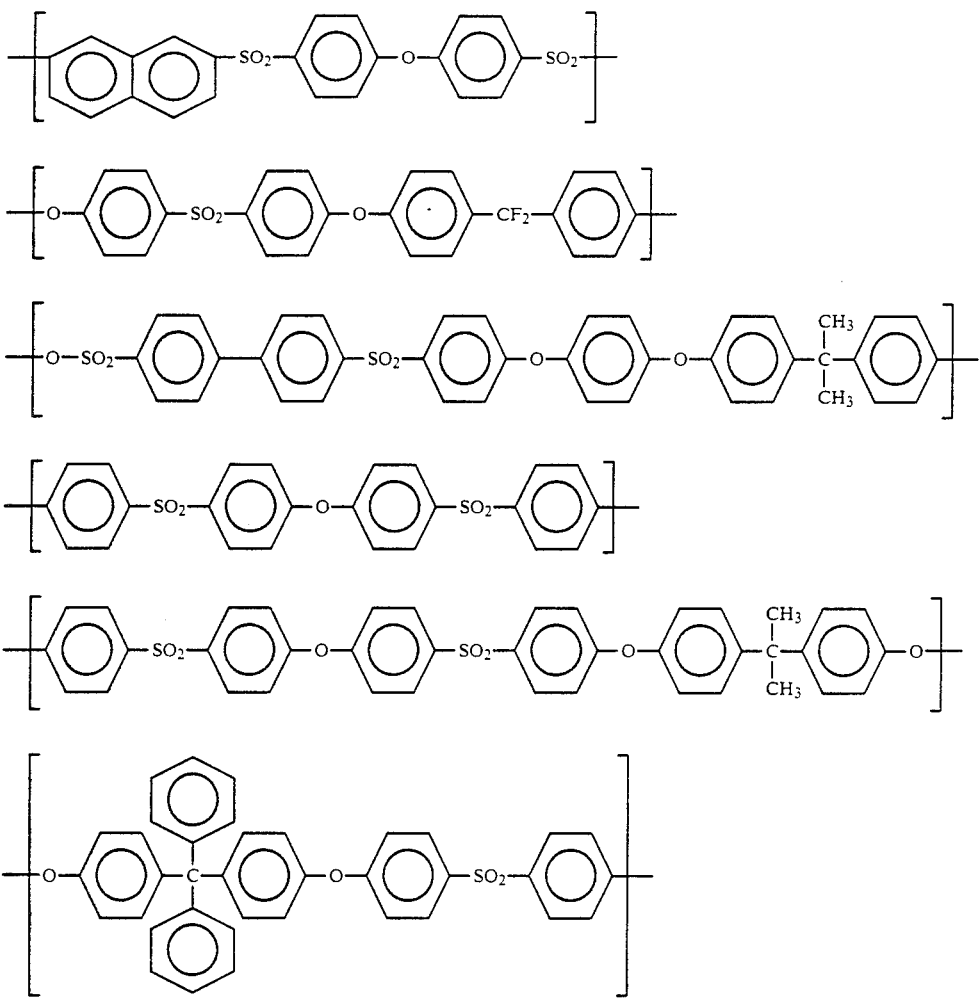

Typical aromatic polysulfones include, for example, polysulfone consisting of recurring units represented by the formula:

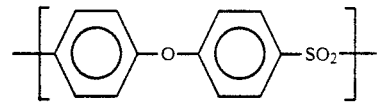

(Trade Mark; VICTREX PES, commercially available from Imperial Chemical Industries in Britain) and polysulfone consisting of recurring units represented by the formula:

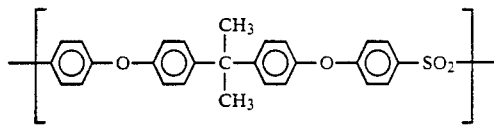

(Trade Mark; UDEL POLYSULFONE, commercially available from Union Carbide Corp. in U.S.A.).

Grades of aromatic polysulfone having various polymerization degrees can be easily produced Therefore grades having suitable melt viscosity for the desired polymer blend can be optionally selected.

Aromatic polyetherimide is a polymer having both ether and imide linkages as a required bonding unit and is substantially composed of recurring units of the following formula:

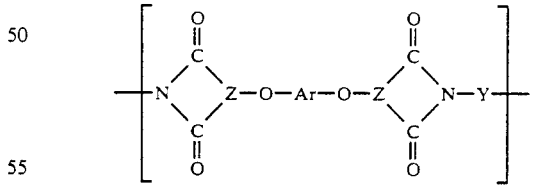

wherein Z is a trivalent aromatic radical where two valences out of three are connected with two adjacent carbon atoms, and Ar and Y are respectively a divalent monoaromatic radical and a divalent non-condensed polyaromatic radical connected with a bridge member.

This polyetherimide is also a well known high temperature engineering polymer and is described, for example, by Takekoshi et al. in Polymer Preprint 24, (2),312-313 (1983).

Suitable examples of recurring units constituting aromatic polyetherimide of this invention include:

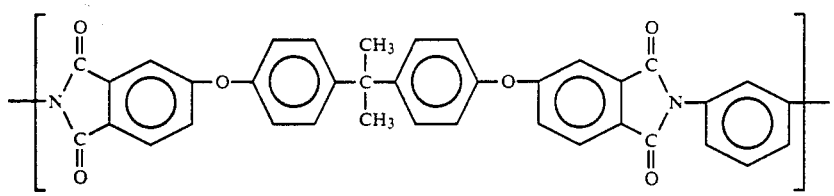
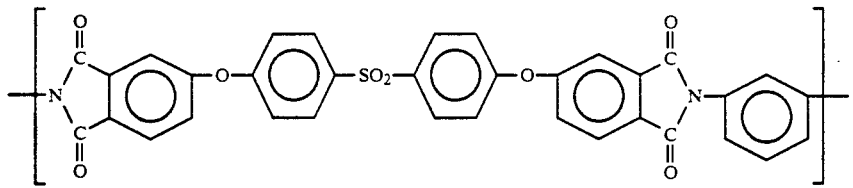
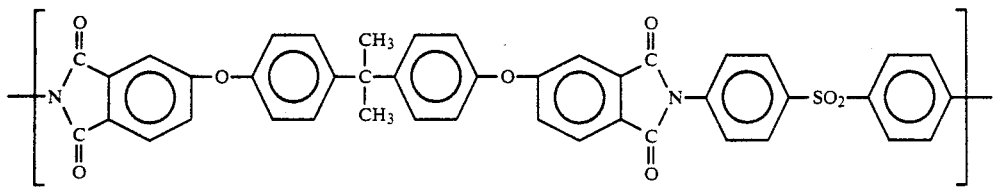
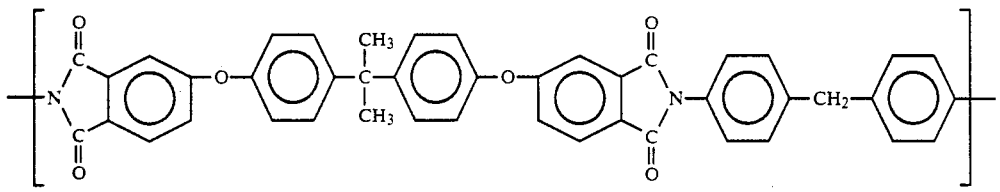
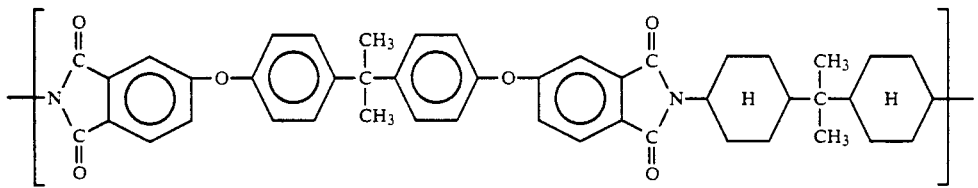
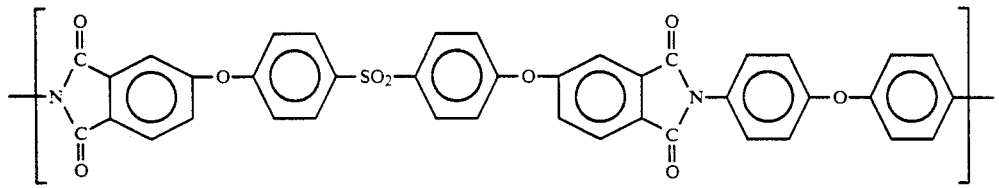
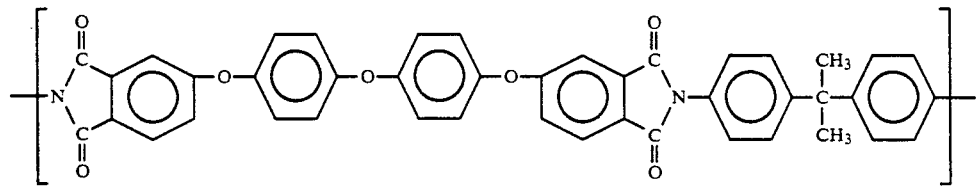
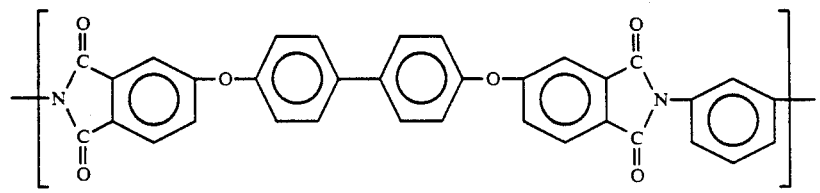

Aromatic polyetherimide is commercially available from General Electric Co. in U.S.A. with the Trade Mark of ULTEM-1000, ULTEM-4000 and ULTEM-6000.

Aromatic polyetherimide particularly consisting of recurring units of the formula:

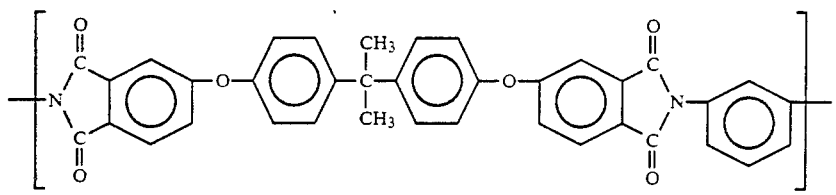

is commercially available from General Electric Co. with the Trade Mark of ULTEM-1000.

Grades of aromatic polyetherimide having various polymerization degrees can be easily produced. Therefore grades having suitable melt viscosity for the desired polymer blend can be optionally selected.

The molding composition of resin in this invention is prepared so as to comprise the above mentioned polyimide in the range of 99.9 to 50% by weight and the high-temperature engineering polymer in the range of 0.1 to 50% by weight.

The resin of this invention based on polyimide/polyphenylene sulfide exhibits remarkably low melt viscosity in a high temperature region above 320° C. The good fluidization effect of polyphenylene sulfide can be found even in a small amount. The lower limit of the amount in the composition is 0.1% by weight. The preferred amount is not less than 0.5% by weight.

Polyphenylene sulfide is excellent in chemical resistance, water absorption and flame retardance among the high-temperature stable polymers It, however, is inferior particularly in elongation at break and impact resistance. Therefore too much polyphenylene sulfide in the above composition is unfavorable because the essential mechanical strength of polyimide can not be maintained. The amount of polyphenylene sulfide in the composition has an upper limit and is preferably 50% by weight or less.

The resin of this invention based on polyimide/aromatic polysulfone exhibits remarkably low melt viscosity in a high temperature region such as above 330° C. The good fluidization effect of aromatic polysulfone can be found even in a small amount. The lower limit of amount in the composition is 0.1% by weight. The preferred amount is not less than 0.5% by weight.

Aromatic polysulfone is excellent in mechanical strength at high temperatures among the high-temperature stable polymers. It, however, is inferior to polyimide in mechanical strength, izod impact strength in particular. Therefore, too much aromatic polysulfone in the above composition is unfavorable because the essential mechanical strength of polyimide cannot be maintained. The amount of aromatic polysulfone in the composition has an upper limit and is preferably 50% by weight or less.

The resin of this invention based on polyimide/aromatic polyetherimide exhibits remarkably low melt viscosity as compared with polyimide alone in a high temperature region, above 350° C. in particular. The effect can be found even in a small amount of aromatic polyetherimide. The lower limit in the composition is 0.1% by weight. The preferred amount is not less than 0.5% by weight.

Aromatic polyetherimide is excellent in mechanical strength at high temperatures among the high-temperature stable polymers It, however, is inferior to polyimide in mechanical strength, izod impact strength in particular. Therefore, too much aromatic polyetherimide is unfavorable because the essential mechanical strength of polyimide cannot be maintained.

Aromatic polyetherimide is easily soluble in halogenated hydrocarbons such as methylene chloride and chloroform as well as amide type solvents such as dimethyl acetamide and N-methylpyrrolidone. Therefore too much amount of aromatic polyetherimide in the composition is unfavorable because the essential solvent resistance of polyimide cannot be maintained.

For these reasons, the amount of aromatic polytherimide has an upper limit in the composition and is preferably 50% by weight or less.

In the preparation of the composition in this invention, common known methods can be employed and, for example, below described methods are preferred.

(1) Polyimide powder and high-temperature engineering polymer powder are pre-mixed to prepare a uniform mixture of powder by using a blender such as a mortar, Henshel mixer, drum blender, tumbler blender, ball mill or ribbon blender.

(2) Polyimide powder is previously dissolved or suspended in an organic solvent. High-temperature engineering polymer is added to the resulting solution or suspension and dispersed uniformly, followed by removing the solvent to give a powdered mixture.

(3) High-temperature engineering polymer is suspended in an organic solvent solution of polyamic acid which is the precursor of polyimide in this invention. The resultant suspension is imidized by heat treatment at 100–400° C. or by chemical imidization with a usual imidizing agent, followed by removing the solvent to give a powdered mixture.

The powdered resin composition of polyimide thus obtained can be used as is for various molding applications such as injection molding, compression molding, transfer molding and extrusion molding. A more preferred method is blending of fused resin prior to molding.

Fusion blending of polyimide and high-temperature engineering polymer in the forms of respectively powder and powder, pellet and pellet, or powder and pellet is also a simple and effective method.

Fusion blending can be carried out by using fusion blending equipment for usual rubber and plastics, for example, hot rolls, Banbury mixer, Brabender and extruder. The fusion temperature is set above the fusion temperature of the formulated system and below the initiation temperature of its decomposition. The temperature for blending polyimide with polyphenylene sulfide is normally in the range of 300–420° C. and preferably in the range of 320-400° C. The blending of polyimide with aromatic polysulfone or aromatic polyetherimide is carried out normally in the range of 280-420° C. and preferably in the range of 300-400° C.

As to the molding method of resin composition in this invention, injection and extrusion moldings are suitable because these methods form an uniform blend of fused polymers and have a high productivity. Other processing methods such as transfer molding, compression molding and sinter molding may also be applied.

In addition, the resin composition of this invention may contain at least one solid lubricant such as molybdenum disulfide, graphite, boron nitride, lead monoxide and lead powder. The composition may also contain at least one reinforcing material such as glass fiber, carbon fiber, aromatic polyamide fiber, potassium titanate fiber and glass beads.

The resin composition of this invention may also contain at least one commonly used additive within the range which has no adverse effect on the object of this invention. Such additives include, for example, antioxidants, heat stabilizers, ultraviolet ray absorbers, flame retardants, auxiliary flame retardants, antistatic agents, lubricants and coloring agents.

EXAMPLES

The present invention will hereinafter be illustrated further in detail by way of synthesis examples, examples and comparative examples.

SYNTHESIS EXAMPLE 1

A reaction vessel equipped with a stirrer, reflux condenser and nitrogen inlet tube was charged with 6.68 kg (10 moles) of bis[4-(4-(4-amino-α,α-dimethylbenzyl)-phenoxy)phenyl]sulfone, and 50.0 kg of N,N-dimethylacetamide. The mixture was added with 2.14 kg (9.8 moles) of pyromellitic dianhydride in a nitrogen atmosphere at the room temperature and at a rate to avoid a large temperature rise of the solution and stirred for 20 hours at the room temperature.

To the resultant solution, 2.02 kg (20 moles) of triethylamine and 2.55 kg (25 moles) of acetic anhydride were added dropwise in a nitrogen atmosphere at the room temperature and stirred for 20 hours at the room temperature to obtain a light yellow slurry. The slurry was filtered, washed with methanol, filtered again and dried at 180° C. for 8 hours under reduced pressure to obtain 8.26 kg (about 97.6% yield) of polyimide as light yellow powder. The inherent viscosity of the polyimide powder was 0.83 dl/g. The inherent viscosity was measured at 35° C. after dissolving 0.5 g of the polyimide powder in 100 ml of a solvent (a mixture of p-chlorophenol and phenol in a ratio of 90:10 by weight) at elevated temperatures and cooling the resulting solution. The glass transition temperature Tg of the polyimide was 280° C. in accordance with DSC method and 5% weight loss temperature was 545° C. in accordance with DTA-TG method.

SYNTHESIS EXAMPLES 2-6

The same procedures as Synthesis example 1 was carried out except using various combinations of diamines and tetracarboxylic acid dianhydrides to obtain a variety of polyimide powders Table 1 illustrates synthesis conditions, inherent viscosities and glass transition temperatures of the polyimides obtained.

TABLE 1

| Synthesis example | Diamine kg (mole) | Tetracarboxylic acid dianhydride kg (mole) | Inherent viscosity (dl/g) | Tg (°C.) |
|---|---|---|---|---|
| 2 | Bis[4-(4-(4-amino-α,α-dimethylbenzyl)phenoxy)phenyl] sulfone 6.68 kg (10 mole) | 3,3',4,4'-Benzophenonetetracarboxylic dianhydride 3.16 kg (9.8 mole) | 0.86 | 250 |
| 3 | 4,4'-Bis[4-(4-amino-α,α-dimethylbenzyl)phenoxy]benzophenone 6.32 kg (10 mole) | Pyromellitic dianhydride 2.14 kg (9.8 mole) | 0.87 | 245 |
| 4 | 4,4'-Bis[4-(4-amino-α,α-dimethylbenzyl)phenoxy]benzophenone 6.35 kg (9.5 mole) Bis(4-aminophenyl) ether 0.101 kg (0.5 mole) | 3,3',4,4'-Benzophenonetetracarboxylic dianhydride 3.14 kg (9.8 mole) | 0.80 | 280 |
| 5 | Bis[4-(4-(4-amino-α,α-dimethylbenzyl)phenoxy)phenyl] sulfone 6.0 kg (9 mole) 2,2-Bis[4-(3-aminophenoxy)phenyl]propane 0.41 kg (1 mole) | Pyromellitic dianhydride 2.15 kg (9.85 mole) | 0.91 | 270 |
| 6 | Bis-[4-(4-(4-amino-α,α-dimethylbenzyl)phenoxy)phenyl] sulfone 6.68 kg (10 mole) | Pyromellitic dianhydride 1.09 kg (5 mole) 4,4'-(p-Phenylenedioxy)diphthalic dianhydride 1.95 kg (4.85 mole) | 0.87 | 242 |

EXAMPLES 1-3

The polyimide powder obtained in Synthesis example 1 was dry blended with commercially available polyphenylene sulfide powder RYTON-P4 (Trade Mark of Phillips Petroleum Co.) in various compositions as illustrated in Table 2 and pelletized by extruding at 300-320° C. with a twin screw extruder The pellets thus obtained were injection molded at an injection temperature of 330-360° C. and a mold temperature of 150° C. The physical and thermal properties of the molded product were measured and the results are illustrated in Table 2. In Table 2, tensile strength and elongation at break, flexural strength and flexural modulus, izod impact strength, and heat distortion temperature were respectively measured in accordance with ASTM D-638, D-790, D-256 and D-648.

Table 2 also illustrates minimum injection pressure which indicates melt flowability. Lower minimum injection pressure results from lower melt flowability.

COMPARATIVE EXAMPLE 1

The same procedures as Examples 1-3 were carried out by using a composition outside the scope of this invention. The physical and thermal properties were measured and the results are illustrated in Table 2.

TABLE 2

| Example or Comparative example | Polyimide Synthesis example | Polyimide (wt. parts) | Polyphenylene sulfide RYTON-P4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Example 1 | 1 | 95 | 5 | 420 | 1,150 | 62 | 1,950 | 38,800 | 16.0 | 259 |
| Example 2 | 1 | 75 | 25 | 170 | 1,120 | 59 | 1,940 | 40,800 | 15.2 | 256 |
| Example 3 | 1 | 50 | 50 | * | 1,080 | 50 | 1,880 | 41,800 | 10.5 | 248 |
| Comp. Example 1 | 1 | 100 | 0 | 580 | 1,150 | 62 | 1,950 | 38,000 | 16.0 | 260 |

*Lower than detection limit of 40 kg/cm$^2$.

EXAMPLES 4-15 AND COMPARATIVE EXAMPLES 2-6

Uniformly formulated pellets were prepared by using the polyimide powder obtained in Synthesis examples 2-6 and the same procedures as Examples 1-3 The pellets were similarly injection molded. The physical and thermal properties were measured Tables 3-4 illustrate the results of compositions in the scope of this invention as Examples 4-15 and those outside the scope of this invention as Comparative examples 2-6.

(Trade Mark of Imperial Chemicals Industries, Ltd.) in various compositions as illustrated in Table 5 and pelletized by extruding at 330-350° C. with a twin screw extruder The pellets thus obtained were injection molded at an injection temperature of 340-380° C. and a mold temperature of 150° C. The physical and thermal properties of the molded product were measured and the results are illustrated in Table 5. In Table 5, glass transition temperature Tg was measured in accordance with TMA penetration method.

TABLE 3

| Example or Comparative example | Polyimide Synthesis example | Polyimide (wt. parts) | Polyphenylene sulfide RYTON-P4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 4 | 2 | 95 | 5 | 400 | 1,520 | 40 | 1,800 | 37,000 | 11.8 | 227 |
| Ex. 5 | 2 | 50 | 50 | * | 1,440 | 34 | 1,720 | 41,000 | 8.5 | 212 |
| Comp. 2 | 2 | 100 | 0 | 550 | 1,520 | 40 | 1,800 | 36,100 | 12.0 | 228 |
| Ex. 6 | 3 | 95 | 5 | 400 | 1,130 | 85 | 1,850 | 38,000 | 18.0 | 220 |
| Ex. 7 | 3 | 75 | 25 | 130 | 1,100 | 81 | 1,830 | 40,000 | 17.0 | 216 |
| Ex. 8 | 3 | 50 | 50 | * | 1,050 | 76 | 1,800 | 41,400 | 12.0 | 206 |
| Comp. 3 | 3 | 100 | 0 | 560 | 1,130 | 85 | 1,850 | 37,000 | 18.0 | 221 |
| Ex. 9 | 4 | 95 | 5 | 500 | 1,200 | 64 | 1,650 | 37,000 | 11.8 | 260 |
| Ex. 10 | 4 | 85 | 15 | 410 | 1,190 | 61 | 1,640 | 38,600 | 11.5 | 255 |
| Comp. 4 | 4 | 100 | 0 | 650 | 1,200 | 65 | 1,650 | 36,000 | 12.0 | 260 |

*Lower than detection limit of 40 kg/cm$^2$.

TABLE 4

| Example or Comparative example | Polyimide Synthesis example | Polyimide (wt. parts) | Polyphenylene sulfide RYTON-P4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 11 | 5 | 95 | 5 | 370 | 1,350 | 64 | 1,850 | 37,500 | 17.8 | 248 |
| Ex. 12 | 5 | 50 | 50 | * | 1,250 | 53 | 1,750 | 41,200 | 12.0 | 232 |
| Comp. 5 | 5 | 100 | 0 | 560 | 1,350 | 65 | 1,850 | 37,000 | 18.0 | 248 |
| Ex. 13 | 6 | 95 | 5 | 360 | 1,100 | 67 | 1,750 | 35,500 | 16.0 | 220 |
| Ex. 14 | 6 | 75 | 25 | 120 | 1,070 | 63 | 1,720 | 38,800 | 14.8 | 216 |
| Ex. 15 | 6 | 50 | 50 | * | 1,000 | 55 | 1,650 | 40,400 | 9.8 | 210 |
| Comp. 6 | 6 | 100 | 0 | 520 | 1,100 | 70 | 1,750 | 35,000 | 16.0 | 220 |

*Lower than detection limit of 40 kg/cm$^2$.

EXAMPLES 16-18

The polyimide powder obtained in Synthesis example 1 was dry blended with commercially available aromatic polysulfone powder VICTREX PES 3600P

COMPARATIVE EXAMPLE 7

The same procedures as Examples 16-18 were carried out by using a composition outside the scope of this invention. The physical and thermal properties were measured and the results are illustrated in Table 5.

TABLE 5

| Example or Comparative example | Polyimide Synthesis example | Polyimide (wt. parts) | Aromatic polysulfone VICTREX PES 3600P (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|
| Example 16 | 1 | 95 | 5 | 490 | 1,150 | 62 | 1,950 | 38,000 | 16.0 | 260 | 283 |
| Example 17 | 1 | 75 | 25 | 380 | 1,140 | 62 | 1,950 | 37,800 | 15.6 | 258 | 280 |
| Example 18 | 1 | 50 | 50 | 340 | 1,120 | 63 | 1,900 | 37,000 | 15.0 | 252 | 274 |

TABLE 5-continued

| Example or Comparative example | Polyimide Synthesis example | (wt. parts) | Aromatic polysulfone VICTREX PES 3600P (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Comp. Example 7 | 1 | 100 | 0 | 580 | 1,150 | 62 | 1,950 | 38,000 | 16.0 | 260 | 283 |

EXAMPLES 19-29 AND COMPARATIVE EXAMPLES 8-12

The polyimide powder obtained in Synthesis examples 2-6 was mixed with aromatic polysulfone. Commercially available VICTREX PES 3600P (Trade Mark of Imperial Chemicals Industries Ltd.) and UDEL POLYSULFONE P-1700 (Trade Mark of Union Carbide Corp.) are used as aromatic polysulfone. The resulting mixtures having formulations illustrated in Table 6-8 were kneaded in a molten state to obtain uniformly blended pellets.

The pellets above obtained were injection molded with the same conditions as Example 16-18. The molded products were measured to determine their physical and thermal properties. The results obtained are illustrated in Tables 6-8.

aromatic polyetherimide ULTEM 1000 (Trade Mark of General Electric Co.) in various compositions as illustrated in Table 9-11 and pelletized by extruding at 330-350° C. with a twin screw extruder. The pellets thus obtained were injection molded at an injection temperature of 360-380° C. and a mold temperature of 150° C. The physical and thermal properties of the molded product were measured and the results are illustrated in Table 9-11.

COMPARATIVE EXAMPLE 13-18

The same procedures as Examples 30-44 were carried out by using a composition outside the scope of this invention. The physical and thermal properties were measured and the results are illustrated in Table 9-11.

In the method of this invention, there is provided

TABLE 6

| Example or Comparative example | Polyimide Synthesis example | (wt. parts) | Aromatic Polysulfone VICTREX PES 3600P (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 19 | 2 | 95 | 5 | 470 | 1,520 | 43 | 1,800 | 36,100 | 12.0 | 228 | 253 |
| Ex. 20 | 2 | 50 | 50 | 320 | 1,440 | 59 | 1,760 | 35,000 | 11.5 | 226 | 248 |
| Comp. 8 | 2 | 100 | 0 | 550 | 1,520 | 40 | 1,800 | 36,100 | 12.0 | 228 | 253 |

TABLE 7

| Example or Comparative example | Polyimide Synthesis example | (wt. parts) | Aromatic Polysulfone UDEL POLYSULFONE P-1700 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 21 | 3 | 95 | 5 | 430 | 1,130 | 88 | 1,850 | 37,000 | 18.0 | 221 | 247 |
| Ex. 22 | 3 | 75 | 25 | 310 | 1,110 | 95 | 1,840 | 36,800 | 18.0 | 221 | 246 |
| Ex. 23 | 3 | 50 | 50 | 265 | 1,070 | 99 | 1,800 | 36,300 | 16.5 | 218 | 242 |
| Comp. 9 | 3 | 100 | 0 | 560 | 1,130 | 85 | 1,850 | 37,000 | 18.0 | 221 | 247 |
| Ex. 24 | 4 | 97 | 3 | 470 | 1,200 | 68 | 1,650 | 36,000 | 12.0 | 260 | 280 |
| Ex. 25 | 4 | 50 | 50 | 270 | 1,150 | 95 | 1,620 | 35,500 | 11.0 | 250 | 268 |
| Comp. 10 | 4 | 100 | 0 | 650 | 1,200 | 65 | 1,650 | 36,000 | 12.0 | 260 | 280 |
| Ex. 26 | 5 | 90 | 10 | 440 | 1,350 | 75 | 1,850 | 37,000 | 18.0 | 245 | 268 |
| Ex. 27 | 5 | 75 | 25 | 300 | 1,300 | 90 | 1,780 | 36,000 | 17.0 | 240 | 263 |
| Comp. 11 | 5 | 100 | 0 | 560 | 1,350 | 65 | 1,850 | 37,000 | 18.0 | 248 | 270 |

TABLE 8

| Example or Comparative example | Polyimide Synthesis example | (wt. parts) | Aromatic Polysulfone VICTREX PES 3600P (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 28 | 6 | 90 | 10 | 410 | 1,100 | 78 | 1,740 | 34,800 | 16.0 | 220 | 243 |
| Ex. 29 | 6 | 75 | 25 | 360 | 1,050 | 82 | 1,700 | 34,200 | 15.0 | 217 | 241 |
| Comp. 12 | 6 | 100 | 0 | 520 | 1,100 | 70 | 1,750 | 35,000 | 16.0 | 220 | 243 |

EXAMPLES 30-44

The polyimide powders obtained in Synthesis examples 1-6 were dry blended with commercially available polyimide base resin compositions having an extraordinary excellent processing ability in addition to the essentially outstanding properties of polyimide.

TABLE 9

| Example or Comparative example | Polyimide Synthesis example | Polyimide (wt. parts) | Aromatic Polyetherimide ULTEM 1000 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 30 | 1 | 95 | 5 | 560 | 1,150 | 62 | 1,940 | 38,000 | 15.5 | 257 |
| Ex. 31 | 1 | 85 | 15 | 530 | 1,140 | 62 | 1,910 | 37,500 | 14.5 | 253 |
| Ex. 32 | 1 | 75 | 25 | 505 | 1,130 | 62 | 1,880 | 37,200 | 13.5 | 248 |
| Ex. 33 | 1 | 50 | 50 | 450 | 1,110 | 61 | 1,800 | 36,300 | 11.0 | 235 |
| Comp. 13 | 1 | 100 | 0 | 580 | 1,150 | 62 | 1,950 | 38,000 | 16.0 | 260 |
| Ex. 34 | 2 | 90 | 10 | 510 | 1,500 | 42 | 1,780 | 36,000 | 11.5 | 226 |
| Ex. 35 | 2 | 75 | 25 | 470 | 1,450 | 46 | 1,730 | 35,800 | 10.5 | 223 |
| Comp. 14 | 2 | 100 | 0 | 550 | 1,520 | 40 | 1,800 | 36,100 | 12.0 | 228 |

TABLE 10

| Example or Comparative example | Polyimide Synthesis example | Polyimide (wt. parts) | Aromatic Polyetherimide ULTEM 1000 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 36 | 3 | 90 | 10 | 530 | 1,120 | 83 | 1,830 | 36,800 | 17.0 | 219 |
| Ex. 37 | 3 | 75 | 25 | 490 | 1,110 | 80 | 1,790 | 36,500 | 15.5 | 216 |
| Ex. 38 | 3 | 50 | 50 | 440 | 1,090 | 75 | 1,710 | 35,800 | 12.5 | 211 |
| Comp. 15 | 3 | 100 | 0 | 560 | 1,130 | 85 | 1,850 | 37,000 | 18.0 | 221 |
| Ex. 39 | 4 | 95 | 5 | 620 | 1,200 | 65 | 1,640 | 35,800 | 11.5 | 257 |
| Ex. 40 | 4 | 50 | 50 | 470 | 1,160 | 65 | 1,580 | 35,200 | 9.0 | 233 |
| Comp. 16 | 4 | 100 | 0 | 650 | 1,200 | 65 | 1,650 | 36,000 | 12.0 | 260 |

TABLE 11

| Example or Comparative example | Polyimide Synthesis example | Polyimide (wt. parts) | Aromatic Polyetherimide ULTEM 1000 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 41 | 5 | 90 | 10 | 530 | 1,330 | 65 | 1,820 | 36,800 | 17.0 | 244 |
| Ex. 42 | 5 | 75 | 25 | 490 | 1,310 | 65 | 1,800 | 36,500 | 15.5 | 238 |
| Comp. 17 | 5 | 100 | 0 | 560 | 1,350 | 65 | 1,850 | 37,800 | 18.0 | 248 |
| Ex. 43 | 6 | 75 | 25 | 450 | 1,090 | 68 | 1,700 | 34,700 | 13.5 | 215 |
| Ex. 44 | 6 | 50 | 50 | 420 | 1,080 | 67 | 1,650 | 34,300 | 11.0 | 210 |
| Comp. 18 | 6 | 100 | 0 | 520 | 1,100 | 70 | 1,750 | 35,000 | 16.0 | 220 |

What is claimed is:

1. A polyimide resin composition comprised of 99.9 to 50% weight of a polyimide which has recurring units of the formula:

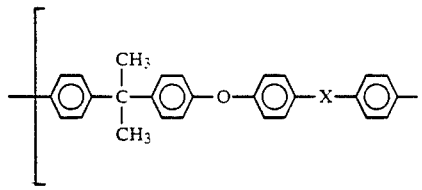

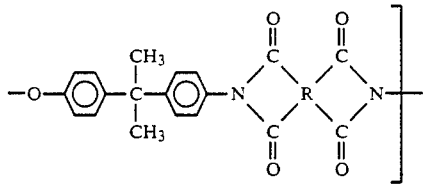

wherein X is a sulfonyl radical or carbonyl radical and R is a tetra-valent radical selected from the group consisting of aliphatic radical having 2 or more carbon atoms, alicyclic radical, monoaromatic radical, condensed polyaromatic radical, or non-condensed polyaromatic radical wherein aromatic radicals are linked to one another directly or via bridge member, and 0.1 to 50% by weight of a high temperature engineering polymer selected from the group consisting of polyphenylene sulfide, aromatic polysulfone and polyetherimide substantially composed of recurring units of the following formula:

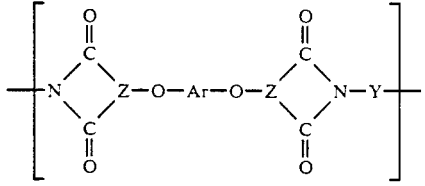

wherein Z is a trivalent aromatic radical and Ar and Y are respectively a divalent monoaromatic radical and a divalent non-condensed polyaromatic radical connected with a bridge member.

2. The polyimide resin composition as claimed in claim 1 wherein R is a tetravalent radical selected from the group consisting of

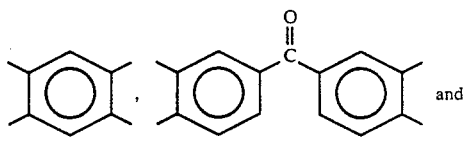 and

3. The polyimide resin composition as claimed in claim 1 wherein the high temperature engineering polymer is polyphenylene sulfide.

4. The polyimide resin composition as claimed in claim 1 wherein the high temperature engineering polymer is aromatic polysulfone.

5. The polyimide resin composition as claimed in claim 1 wherein the high temperature engineering polymer is aromatic polyetherimide.

* * * * *